Patented May 22, 1934

1,959,965

UNITED STATES PATENT OFFICE 1,959,965

MANUFACTURE OF CELLULOSE PRODUCTS

George A. Richter, Berlin, N. H., assignor to Brown Company, Berlin, N. H., a corporation of Maine No Drawing. Application March 24, 1931, Serial No. 525,036

5 Claims. (Cl. 92—20)

This invention relates to the manufacture of cellulose products whereinto a substantially pure form of cellulose, such as cotton or white chemical wood pulp, goes as the raw material.

In making papers and cellulose derivatives such as the xanthate, nitrate, or acetate, it is sometimes desirable that the fibers of cotton as found in nature, or those of cellulose pulps as liberated from wood or other raw cellulosic material, be materially reduced in size. In fact, this reduction in fiber size may be carried to advantage in certain instances to such an extent that a powdered cellulose results. A cellulose powder produced mechanically from a substantially pure form of cellulose not only may be converted more easily into cellulose derivatives because of its higher reactivity with the converting chemical, but is useful as a filler or coating material in papers, fabrics, or the like. Through the medium of the powdered cellulose as a papermaking ingredient, such qualities as opacity and surface appearance or "feel" in the finished paper may be readily and economically controlled.

In accordance with the present invention, I subject cellulose fiber of the kind described to only a partial pulverization, by which I mean that the resulting product is made up of powder or particles of fine size, as well as of visible fiber fragments and fibers. A cellulose composition containing units of cellulose ranging from fine particles or dust to fiber fragments or fibers in practically original condition constitutes an excellent raw material for papermaking. Thus, when such a composition is subjected to customary action in the presence of water, the long fibers and fiber fragments undergo hydration or gelatinization, whereas the fine particles undergo little, if any, transformation, remaining as a substantially unhydrated or inert filler in the beaten stock. The beaten stock may be formed into waterleaf papers, which lend themselves nicely to conversion into cellulose derivatives, such as the xanthate, nitrate, or acetate. On the other hand, suitable sizing materials, such as rosin size, and precipitants, such as alum, may be added to the beaten stock to permit it to be fabricated into papers primarily intended for writing or printing purposes. If desired, a suitable proportion of fiber which has not undergone pulverization to any extent may be mixed or blended with the partially pulverized fiber, either before or after the beating operation. The resulting papers are well-formed, uniformly textured sheets, on account of the wide variety of fiber sizes present therein, the fiber fragments and fiber particles of powder closing the sheets uniformly and completely and enhancing their opacity, and the long fibers furnishing the hydrated or gelatinized cellulose requisite for strength, and the interfelting necessary for good tear resistance and fold endurance. If desired, hydrated or gelatinized cellulose prepared independently from suitable cellulose pulp may be admixed with the papermaking furnish containing the pulverized fiber to cement together the pulverized fiber component of the furnish with the long-fibered component of the furnish, in the resulting paper. The papermaking furnish containing the added hydrated cellulose may be sheeted into paper without much beating or after it has undergone substantial beating. Depending on the quantity and fineness of the cellulose particles in the papermaking furnish, the finish of the resulting paper may vary from a comparatively rough surface, known as "egg shell," to a smooth or flat surface, such as is desired in most printing and writing papers.

In some instances, the partially pulverized fiber may be classified or graded into a portion consisting of long fibers and fiber fragments and a portion consisting of powdered fiber and short fiber fragments. For example, the partially pulverized fiber may be delivered to screens designed to retain or catch cellulose units above, say, 30 to 40 mesh, while permitting the finer material to sift therethrough. The coarse portion may be beaten alone or together with other fiber which has not undergone any pulverization whatever, whereupon the fine portion may be incorporated into the beaten stock immediately before its delivery to the papermaking machine. If desired, however, the ungraded, partially pulverized fiber, or the fine portion separated therefrom, may be applied together with binders or sizes such as glue, starch, or dextrine paste, rosin size, casein, or the like, as a coating to either or both faces of the finished paper, or a textile fabric.

The partial pulverization of the cellulose fiber is accomplished, in accordance with the present invention, without effecting its hydration. An advantageous way of so doing is in a ball mill, to which the fiber in original condition may be supplied as a dry bulk pulp or as so-called drier sheets, which latter form is generally that in which chemical wood pulps, especially refined wood pulps of high alpha cellulose content, appear on the market. Under the pounding action of the balls, the fibers are broken up or subdivided into smaller units. The fiber to begin with, being composed of individual units of widely varying fiber lengths, is not uniformly or progressively subdivided, but some units are crushed or pounded into a powder, while others are yet visible as fiber fragments, and still others are of substantially original length. Inasmuch as my invention does not require that the final product as a whole be of a definite particle size, the pulverizing operation may be arrested when only a certain proportion of the fiber has been reduced to the desired fineness. My invention thus makes for a saving of power, since the pulverization of an entire batch of fiber to a definite particle size, e. g., a particle size finer than about 30 to 40 mesh, as hereinbefore described, may require a period of time far greater than twice the period of time consumed in accordance with my invention in reducing only one-half the batch to the same definite particle size. In other words, when a portion of the fiber has once been reduced to exceedingly fine particles, power is expended on such particles with relatively little further subdivision thereof. As the fiber undergoes the pounding action of heavy balls in a ball mill, it becomes heated to a marked degree, and such heat is apt to cause discoloration of the cellulose, especially when it contains a significant proportion of non-alpha cellulose components, which are unstable and yellow under the action of heat. It is also for this latter reason that I prefer to use a pure form of cellulose, such as cotton or white wood pulp of high alpha cellulose content as raw material. My invention cuts down the heat developed in a batch of fiber without recourse to cooling the batch during the pulverizing operation, since the time expended in partially pulverizing the batch is far shorter than the time required for completely pulverizing an entire similar batch. The partial pulverization of the fiber may be carried out in a non-hydrating liquid vehicle, such as benzol, alcohol, acetone, or the like, in apparatus other than ball mills, e. g., in a beater engine. After partial pulverization in such a vehicle, the fine portion may be separated from the coarse portion, as by delivering the partially pulverized batch associated with the liquid vehicle through screens, as hereinbefore described. The liquid vehicle in such case serves as the carrier for the fine particles, and thus facilitates their separation from the coarse particles. The excess liquid carrier present in the fine portion may be removed therefrom, as by filtration or by settling out the solids and then decanting. Such liquid as is retained either by the coarse or fine portions may be volatilized therefrom with the application of heat, if desired, and recovered. The use of benzol or similar volatile organic liquids is of further advantage, in that they are solvents for such residual resins as are present in the fiber serving as the raw material.

The principles of the present invention extend to fibers which have been transformed by suitable chemical treatment into a non-hydratable state, in which case the partial pulverization of the fiber may be accomplished in the presence of water, as in a beater engine. Cellulose fiber which has been mercerized or cellulose which has been regenerated as from viscose syrup are illustrations of cellulose fiber which has undergone alteration into a non-hydratable state.

The expression "chemical wood pulp" or "cellulose compositions containing little other than alpha cellulose" are intended to include chemical wood pulps, such as kraft and sulphite pulp, or analogous pulps liberated from raw cellulosic materials other than wood, such as hemp, as well as preliberated pulps which have been subjected to further chemical refinement or increase in alpha cellulose content. These expressions, however, are not intended to comprehend such materials as wood fiber or sawdust, which contain the high ligneous or encrusting content of the original wood.

What I claim is:

1. A process which comprises mechanically pulverizing to a particle size finer than about 30 to 40 mesh only a portion, but constituting a substantial fraction, of an unmercerized, dry cellulose fiber batch of the nature of chemical wood pulp, beating the partially pulverized batch in water, and forming into paper.

2. A process which comprises pulverizing to a particle size finer than about 30 to 40 mesh only about one-half of an unmercerized, dry cellulose fiber batch of the nature of chemical wood pulp, beating the partially pulverized batch in water, and forming into paper.

3. A process which comprises mechanically pulverizing to a particle size finer than about 30 to 40 mesh only a portion, but constituting a substantial fraction, of an unmercerized, dry cellulose fiber batch of the nature of chemical wood pulp, separating the fine portion from the coarse portion of the batch, beating the coarse portion in water, admixing the fine portion with the beaten coarse portion, and forming the mixture into paper.

4. A process which comprises mechanically pulverizing to a particle size finer than about 30 to 40 mesh only a portion, but constituting a substantial fraction, of an unmercerized, dry cellulose fiber batch of the nature of chemical wood pulp, beating at least the coarse portion of the partially pulverized batch in water, and forming the beaten coarse portion in admixture with the fine portion into paper.

5. A process which comprises pulverizing to a particle size finer than about 30 to 40 mesh only about one-half of an unmercerized, dry cellulose fiber batch of the nature of chemical wood pulp, beating at least the coarse portion of the partially pulverized batch in water, and forming the beaten coarse portion in admixture with the fine portion into paper.

GEORGE A. RICHTER.